United States Patent
Masterson et al.

(10) Patent No.: US 9,937,426 B1
(45) Date of Patent: Apr. 10, 2018

(54) PASSENGER RESTRAINT FOR AN AMUSEMENT RIDE

(71) Applicant: Universal City Studios LLC, Universal City, CA (US)

(72) Inventors: Tom Masterson, Orlando, FL (US);
Steven C. Blum, Orlando, FL (US);
Christopher Oliver, Orlando, FL (US);
Eric A. Vance, Orlando, FL (US);
Daniel Freedman, Orlando, FL (US);
Ted W. Van Winkle, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 0 days.

(21) Appl. No.: 15/591,914

(22) Filed: May 10, 2017

(51) Int. Cl.
| | |
|---|---|
| *A63G 31/12* | (2006.01) |
| *B60R 21/02* | (2006.01) |
| *A63G 4/00* | (2006.01) |
| *A63G 7/00* | (2006.01) |

(52) U.S. Cl.
CPC ............ *A63G 31/12* (2013.01); *A63G 4/00* (2013.01); *B60R 21/02* (2013.01)

(58) Field of Classification Search
CPC .......... A63G 7/00; A63G 31/00; A63G 31/16; B60N 2/01; B60N 2/12; B60N 2/20; B60N 2/36; B60N 2/305; B60N 2/3011; B60N 2/2013

USPC ......... 472/43, 59–60, 130; 296/65.01, 65.09, 296/66
See application file for complete search history.

(56) References Cited

U.S. PATENT DOCUMENTS

| | | | | |
|---|---|---|---|---|
| 5,884,563 | A * | 3/1999 | Sheldon .................. | A61G 3/02 104/53 |
| 6,024,647 | A | 2/2000 | Bennett et al. | |
| 6,149,528 | A * | 11/2000 | Volz ......................... | A63G 7/00 414/921 |
| 2008/0296951 | A1* | 12/2008 | Goshima ................ | B60N 2/366 297/378.13 |
| 2009/0243357 | A1* | 10/2009 | Mori ........................ | B60N 2/30 297/325 |

* cited by examiner

*Primary Examiner* — Kien Nguyen
(74) *Attorney, Agent, or Firm* — Fletcher Yoder, P.C.

(57) ABSTRACT

A ride assembly includes a ride vehicle configured to carry one or more passengers and to move in a direction along a ride path, a first passenger seat of the ride vehicle having a seatback, where the first passenger seat is configured to seat a first passenger of the one or more passengers, and where the seatback is configured to rotate with respect to the ride vehicle from a loading position to an active position, a second passenger seat of the ride vehicle positioned behind the first passenger seat with respect to the direction, where the second passenger seat is configured to seat a second passenger of the one or more passengers, and a passenger restraint coupled to the seatback of the first passenger seat, where the passenger restraint is configured to secure the second passenger in the second passenger seat when the seatback is in the active position.

20 Claims, 7 Drawing Sheets

PASSENGER RESTRAINT FOR AN AMUSEMENT RIDE

FIELD OF DISCLOSURE

The present disclosure relates generally to the field of amusement parks. More specifically, embodiments of the present disclosure relate to systems and methods utilized to provide amusement park experiences.

BACKGROUND

Various amusement rides have been created to provide passengers with unique motion and visual experiences. For example, theme rides can be implemented with single-passenger or multi-passenger vehicles that travel along a fixed path. Passengers may experience excitement created by the speed or change in direction of the vehicles as they move along the path. Ride vehicles may include passenger restraints to secure passengers into the ride vehicle as the ride vehicle accelerates and/or moves along the fixed path. Unfortunately, passenger restraints may consume relatively large amounts of space in the ride vehicle, thereby reducing a number of passengers that may be transported by the ride vehicle. Additionally, passenger restraints may take up space in aisles and/or walkways of the ride vehicle, which may delay passenger loading and/or unloading of the ride vehicle. Accordingly, it is now recognized that there is a need for an improved passenger restraint for ride vehicles of amusement rides.

BRIEF DESCRIPTION

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In accordance with one embodiment, a ride assembly includes a ride vehicle configured to carry one or more passengers and to move in a direction along a ride path, a first passenger seat of the ride vehicle having a seatback, where the first passenger seat is configured to seat a first passenger of the one or more passengers, and where the seatback is configured to rotate with respect to the ride vehicle from a loading position to an active position, a second passenger seat of the ride vehicle positioned behind the first passenger seat with respect to the direction, where the second passenger seat is configured to seat a second passenger of the one or more passengers, and a passenger restraint coupled to the seatback of the first passenger seat, where the passenger restraint is configured to secure the second passenger in the second passenger seat when the seatback is in the active position.

In accordance with another embodiment, a ride assembly includes a ride vehicle configured to carry a plurality of passengers and to move in a direction along a ride path, a plurality of passenger seats of the ride vehicle, where each of the plurality of passenger seats is configured to seat a corresponding passenger of the plurality of passengers, a plurality of seatbacks of the plurality of passenger seats, wherein each seatback of the plurality of seatbacks is configured to rotate with respect to the ride vehicle from a loading position to an active position, and a passenger restraint coupled to a first seatback of the plurality of seatbacks of a first passenger seat of the plurality of passenger seats, where the passenger restraint is configured to secure a passenger of the plurality of passengers in a second passenger seat of the plurality of passenger seats when the seatback is in the active position, and where the second passenger seat is positioned behind the first passenger seat with respect to the direction.

In accordance with another embodiment, a ride assembly includes a ride vehicle configured to carry one or more passengers and to move in a direction along a ride path, a base of the ride vehicle configured to move in the direction along the ride path, a first passenger platform of the ride vehicle, a second passenger platform of the ride vehicle positioned behind the first passenger platform with respect to the direction, where the first and second passenger platforms are configured to rotate with respect to the base from a loading position to an active position, a first passenger seat of the ride vehicle coupled to the first passenger platform, a second passenger seat of the ride vehicle coupled to the second passenger platform, and a passenger restraint coupled to a seatback of the first passenger seat, wherein the passenger restraint is configured to secure a passenger of the one or more passengers in the second passenger seat when the first and second passenger platforms are in the active position.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Present embodiments of the disclosure are directed to a passenger restraint for a ride vehicle of an amusement ride that is integrated into a seatback of an adjacent seat of the ride vehicle. For example, the passenger restraint configured to secure a given passenger may be included in (or coupled to) the seatback of a seat in front of the passenger (e.g., with respect to a direction of travel of the ride vehicle). In accordance with embodiments of the present disclosure, the seats of the ride vehicle may tilt, recline, or otherwise change position to engage the passenger and secure the passenger in the ride vehicle as the ride vehicle moves along a ride path (e.g., a fixed and/or predetermined path of the ride vehicle). Incorporating a passenger restraint into the seatback of an adjacent seat may increase an amount of space available on the ride vehicle by eliminating additional components utilized to secure a passenger restraint to the ride vehicle (e.g., coupling arms, rods, shafts, and/or other features). For example, the passenger restraint coupled to a seatback in front of a passenger seat may be the only restraint for the seat, or the passenger restraint coupled to the seatback in front of a passenger seat may work in conjunction with only a seatbelt. Accordingly, the ride vehicle may accompany additional passengers and/or provide additional space in aisles or walkways to facilitate loading and unloading of the passengers from the ride vehicle.

Figure 1:
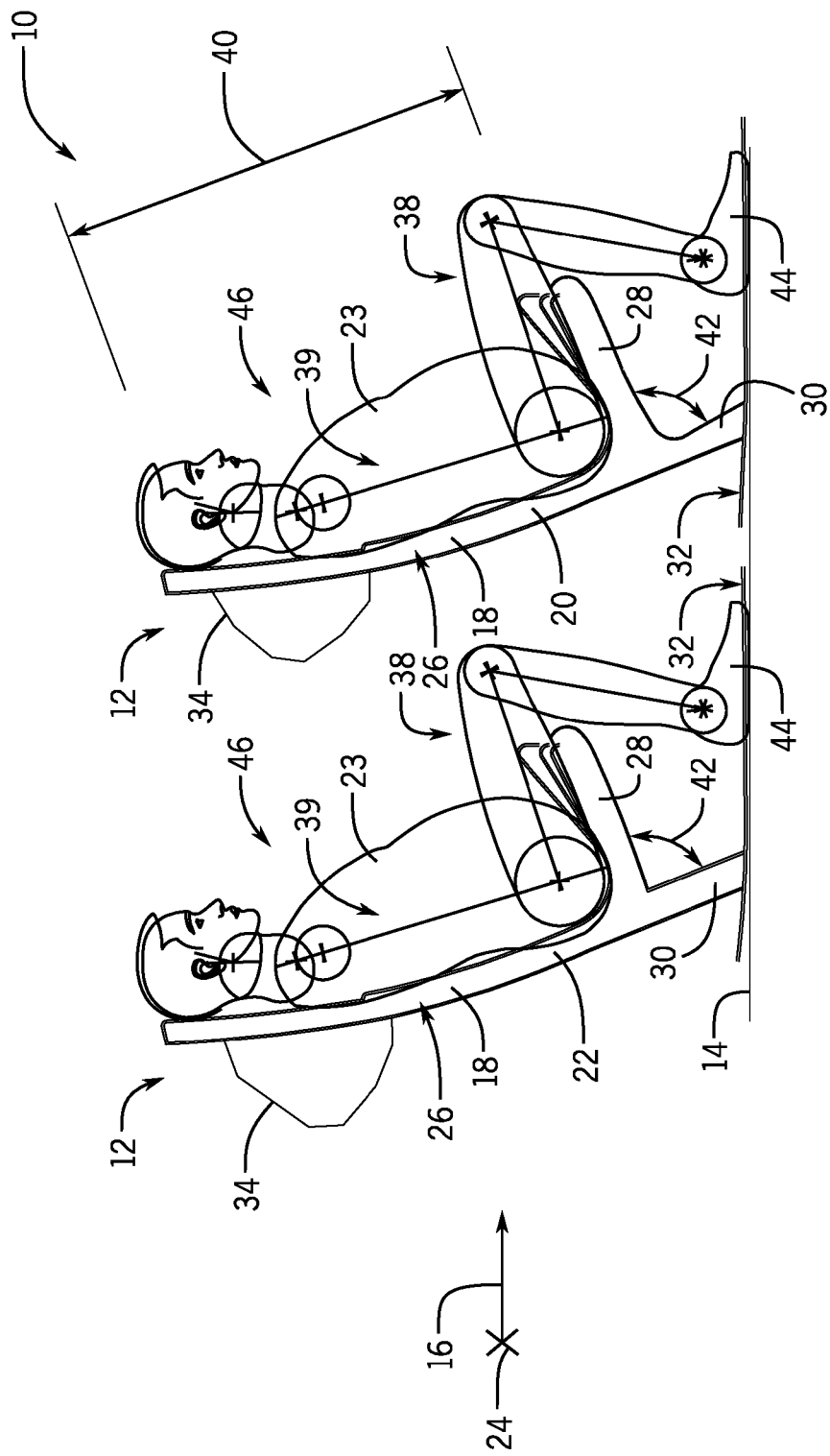
FIG. 1 is an elevation view of an embodiment of a ride vehicle that includes a seatback passenger restraint in a loading position (e.g., erect or upright), in accordance with an aspect of the present disclosure.

FIG. 1 is an elevation view of an embodiment of a ride vehicle 10 that includes passenger seats in a loading position 12 (or unloading position). As shown in the illustrated embodiment of FIG. 1, the ride vehicle 10 may include a base 14. The base 14 may be coupled to a bogie and/or another device configured to move the ride vehicle 10 in a direction 16 of the ride path. In some embodiments, the base 14 may be modular and/or articulated. The base 14 may also be coupled to one or more passenger seats 18. For example, the ride vehicle 10 includes a first passenger seat 20 and a second passenger seat 22. As shown in FIG. 1, the first passenger seat 20 may be positioned in front of (e.g., adjacent to) the second passenger seat 22 with respect to the direction 16 of the ride path. Additionally, the first passenger seat 20 and the second passenger seat 22 are positioned on the base 14 of the ride vehicle 10, such that passengers 23 positioned in the first passenger seat 20 and the second passenger seat 22 face the direction 16 of travel along the ride path. In other embodiments, the first passenger seat 20 and the second passenger seat 22 may be positioned on the base 14, such that the passengers 23 face opposite the direction 16 of travel along the ride path. Although the illustrated embodiment of FIG. 1 illustrates the ride vehicle 10 having two passenger seats 18, other embodiments may include more than two passenger seats 18 (e.g., three, four, five, six, seven, eight, nine, ten, or more passenger seats 18). Additionally, the ride vehicle 10 may include rows of passenger seats 18, such that passenger seats 18 may be adjacent to one another with respect to a lateral axis 24, crosswise to the direction 16 of the ride path in the illustrated embodiment. Therefore, in some embodiments, the ride vehicle 10 may be configured to accommodate between 1 and 100 passengers, between 5 and 50 passengers, or between 10 and 30 passengers.

As shown in the illustrated embodiment of FIG. 1, the passenger seats 18 may include a seatback 26, a seat portion 28, and a support 30. Additionally, in some embodiments, the passenger seats 18 may include hand holds, arm rests, and/or other devices that the passengers 23 may grip as the ride vehicle 10 moves along the ride path. The support 30 may be coupled to a passenger platform 32. The passenger platform 32 may be configured to move (e.g., tilt and/or rotate) with respect to the base 14 (see e.g., FIG. 2). In other embodiments, the support 30 may be hingedly coupled to the base 14. The seatback 26 of one or more of the passenger seats 18 may include a passenger restraint 34 coupled directly to the seatback 26. When the passenger seats 18 are in the loading position 12 as shown in FIG. 1, the passenger restraint 34 may be positioned such that movement of passengers 23 between the passenger seats 18 is not blocked and/or otherwise obstructed. Accordingly, loading and/or unloading of the passengers 23 may be facilitated (e.g., a time to load and/or unload the passengers 23 may decrease). However, when the ride vehicle 10 is in an active position (see, e.g., FIG. 2), the passenger restraint 34 may be configured to secure passengers 23 within the passenger seats 18 (e.g., substantially block movement of the passengers 23 with respect to the ride vehicle 10).

The passenger restraint 34 may be directly coupled to the seatback 26 via fasteners (e.g., threaded fasteners), adhesives, and/or another suitable technique. The passenger restraint 34 may be directly coupled to the seatback 26 at any suitable position that secures the passengers 23 within the passenger seats 18 when the ride vehicle 10 is in the active position (see, e.g., FIG. 2). In some embodiments, the passenger restraint 34 may include a polymer material and/or another resilient material that may be configured to conform to a shape of a lap 38 of a given passenger 23. In other embodiments, the passenger restraint 34 may include another suitable material that may secure the passengers 23 to the passenger seats 18 (e.g., substantially block movement of the passengers 23 with respect to the passenger seats 18 and the ride vehicle 10) when the ride vehicle 10 is in the active position. In some embodiments, the passenger restraint 34 may couple to or exclude (to limit complexity) an extendable feature (e.g., a telescoping arm) to bring the passenger restraint 34 into close engagement with the respective passenger 23 when activated. As shown in the illustrated embodiment of FIG. 1, the passenger restraint 34 may include a generally semi-circular cross-section configured to conform to the shape of the lap 38 of the passengers 23. Conforming the passenger restraint 34 to the shape of the lap 38 of the passengers 23 may enhance an experience of the passengers 23 by providing additional comfort while the ride vehicle 10 moves along the ride path. In other embodiments, the cross-section of the passenger restraint 34 may include any suitable shape that may secure the passengers 23 in the passenger seats 18 when the ride vehicle 10 is in the active position. The passenger restraint 34 is discussed in more detail herein with reference to FIG. 7.

In certain embodiments, the seatback 26 may include a curvature to conform to a shape of a torso 39 of a given passenger 23. Including the curvature in the seatback 26 may enhance an experience of the passengers 23 by providing additional comfort while the ride vehicle 10 moves along the ride path. Additionally, the seatback 26 may extend a distance 40 from the seat portion 28. The distance 40 may be predetermined based on an average height of the passengers 23 that may ultimately utilize the ride vehicle 10. The seat portion 28 may also be positioned at an angle 42 with respect to the support 30. The angle 42 may be predetermined to provide comfort to the passengers 23 as the ride vehicle 10 moves along the ride path. Additionally, the angle 42 of the seat portion 28 with respect to the support 30 may be predetermined to enable feet 44 of the passengers 23 to touch the base 14 and/or the passenger platform 32. Further, the curvature in the seatback 26 and/or the angle 42 of the seat portion 28 may be configured to position the passengers 23 in a predetermined posture 46. The predetermined posture 46 may be based on a posture that may provide both comfort and ensure that the passengers 23 are secured to the passenger seats 18 as the ride vehicle 10 moves in the direction 16 along the ride path.

Figure 2:
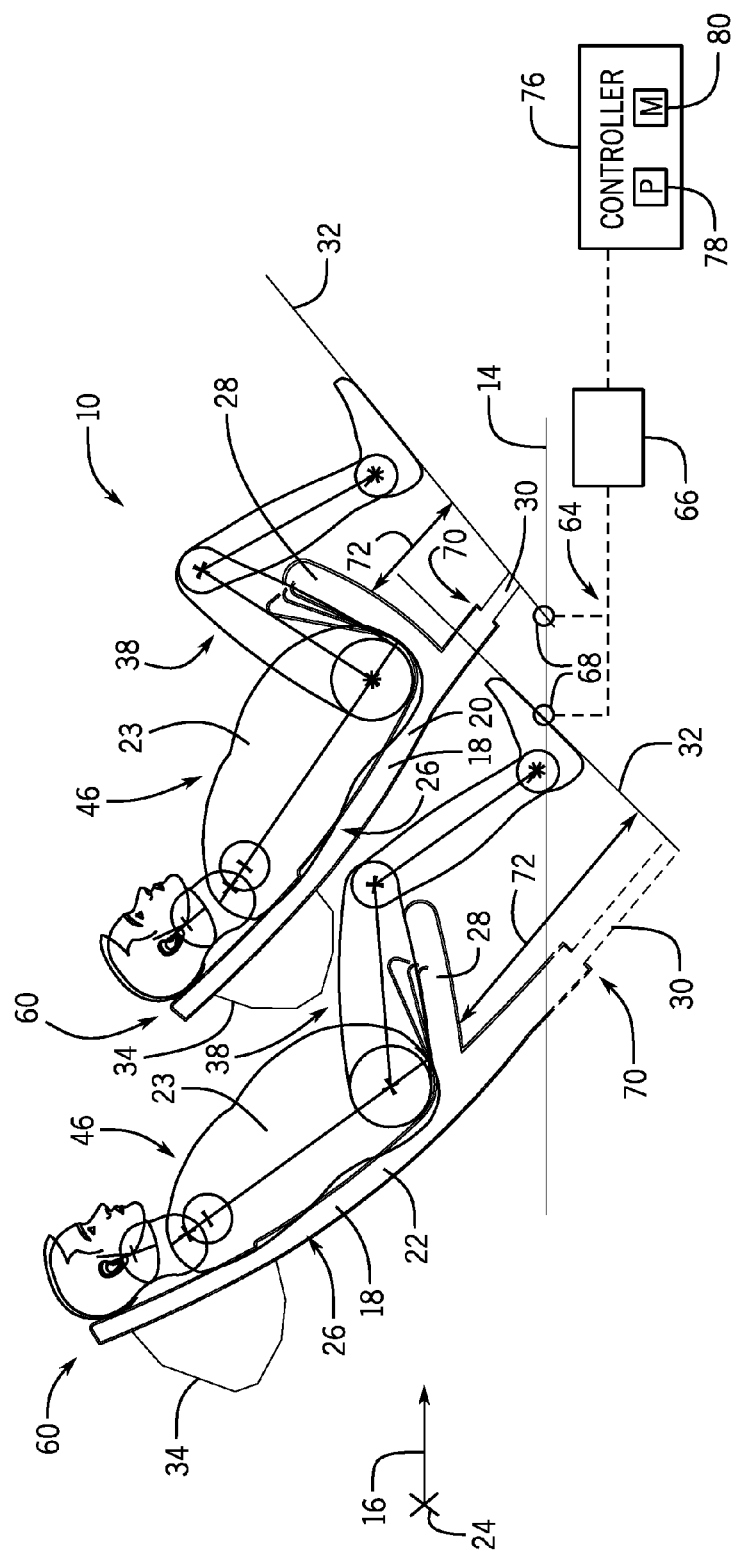
FIG. 2 is an elevation view of an embodiment of the ride vehicle of FIG. 1 with the seatback passenger restraint in an active position (e.g., reclined), in accordance with an aspect of the present disclosure.

FIG. 2 is an elevation view of the passenger seats 18 of the ride vehicle 10 transitioning to an active position 60. As shown in the illustrated embodiment of FIG. 2, the passenger platforms 32 have been rotated and/or tilted with respect to the base 14. Accordingly, the passenger seats 18 have also rotated and/or tilted with respect to the base 14. For example, the passenger seats 18 are generally reclined in the active position 60 such that the passenger restraint 34 of the first passenger seat 20 is being positioned proximate the lap 38 of the passenger 23 seated in the second passenger seat 22. Accordingly, the passenger restraint 34 will engage the passenger 23 in the second passenger seat 22 in the active position 60 to secure the passenger 23 within the second passenger seat 22 as the ride vehicle 10 moves along the ride path.

For example, as the ride vehicle 10 moves along the ride path, the passengers 23 may experience bumps, turns, accelerations, curves, and/or other sharp and rapid movements. Accordingly, the passenger restraint 34 may secure the passengers 23 to the passenger seats 18 by substantially blocking movement of the passengers 23 with respect to the passenger seats 18 (and the ride vehicle 10). Additionally, the passenger restraint 34 may provide the passengers 23 with a sense of security throughout the ride path. While the illustrated embodiment of FIG. 2 shows the first passenger seat 20 in the process of securing the passenger 23 in the second passenger seat 22, it should be noted that a third passenger seat 18 may be positioned in front of the first passenger seat 20 (e.g., relative to the direction 16) and include a passenger restraint 34 that secures the passenger 23 in the first passenger seat 20. Additionally, in other embodiments, the passenger 23 in the first passenger seat 20 may be secured to the passenger seat 18 via another suitable securement feature (e.g., a lap bar, a seat belt, and/or a structural feature of the ride vehicle 10 that includes a passenger restraint 34 and is configured to move with the passenger seats 18 into the active position 60).

In some embodiments, the ride vehicle 10 may include a pivot system 64 configured to rotate (e.g., tilt) the passenger platforms 32 with respect the base 14. For example, the pivot system 64 may include an actuator 66 (e.g., a pneumatic actuator, a hydraulic actuator, or an electronic actuator) positioned below the base 14. In some embodiments, the passenger platform 32 may be coupled to the base 14 via a hinge 68 (e.g., a hinged connection), such that the passenger platform 32 may rotate with respect to the base 14. The actuator 66 may be configured to drive rotation of the passenger platforms 32 about the hinge 68 (e.g., hinged connection), such that the passenger platforms 32 (and thus the passenger seats 18) move from the loading position 12 to the active position 60, and vice versa. In some embodiments, the pivot system 64 may include a single actuator 66 (e.g., coupled to a cam) that may be configured to move both the first passenger seat 20 and the second passenger seat 22 (and the passenger platforms 32). In other embodiments, the pivot system 64 may include an actuator 66 for each passenger seat 18 and/or multiple actuators 66 configured to move any suitable number of the passenger seats 18 (e.g., two, three, four, five, or more).

In certain embodiments, the supports 30 may include telescoping portions 70 such that a length 72 of the supports 30 increases and/or reduces as the passenger platforms 32 and the passenger seats 18 rotate about the hinge 68. The telescoping portions 70 may be substantially straight for linear extension or curved to provide multi-directional extension. In some embodiments, the pivot system 64 may include a mechanical stop that is configured to block movement of the passenger platforms 32 and/or the passenger seats 18 beyond a predetermined position, such that the passenger seats 18 do not inadvertently contact the passengers 23. In other embodiments, the hinge 68 may be configured to block movement of the passenger platforms 32 and/or the passenger seats 18 beyond the predetermined position. In still further embodiments, the pivot system 64 may be coupled to a controller 76 that provides signals (e.g., via a processor 78) to the pivot system 64 instructing the pivot system 64 to initiate movement of the passenger platforms 32 and/or the passenger seats 18 (e.g., to move the passenger seats 18 from the loading position 12 to the active position 60 or vice versa). Therefore, the controller 76 may include electrical stops stored in a memory 80 that are configured to block movement of the passenger platforms 32 and/or the passenger seats 18 beyond the predetermined position. The telescoping portions 70 may be controlled or limited on a seat by beat or passenger by passenger basis to provide customized comfort and functionality.

In some embodiments, the controller 76 may be configured to control additional aspects and/or features of the ride vehicle 10 such as activate movement of the ride vehicle 10 along the ride path, determine the ride path from one or more predetermined ride path options, and/or initiate a braking system of the ride vehicle 10 when the ride vehicle 10 reaches an end of the ride path. Further, the controller 76 may receive feedback from various sensors and/or monitoring devices positioned along the ride path and control features of the ride vehicle 10 in response to the feedback. In other embodiments, the controller 76 may be configured to control any suitable features of the ride vehicle 10 in addition to controlling movement of the passenger platforms 32 and/or the passenger seats 18 from the loading position 12 to the active position 60 and vice versa.

Figure 3:
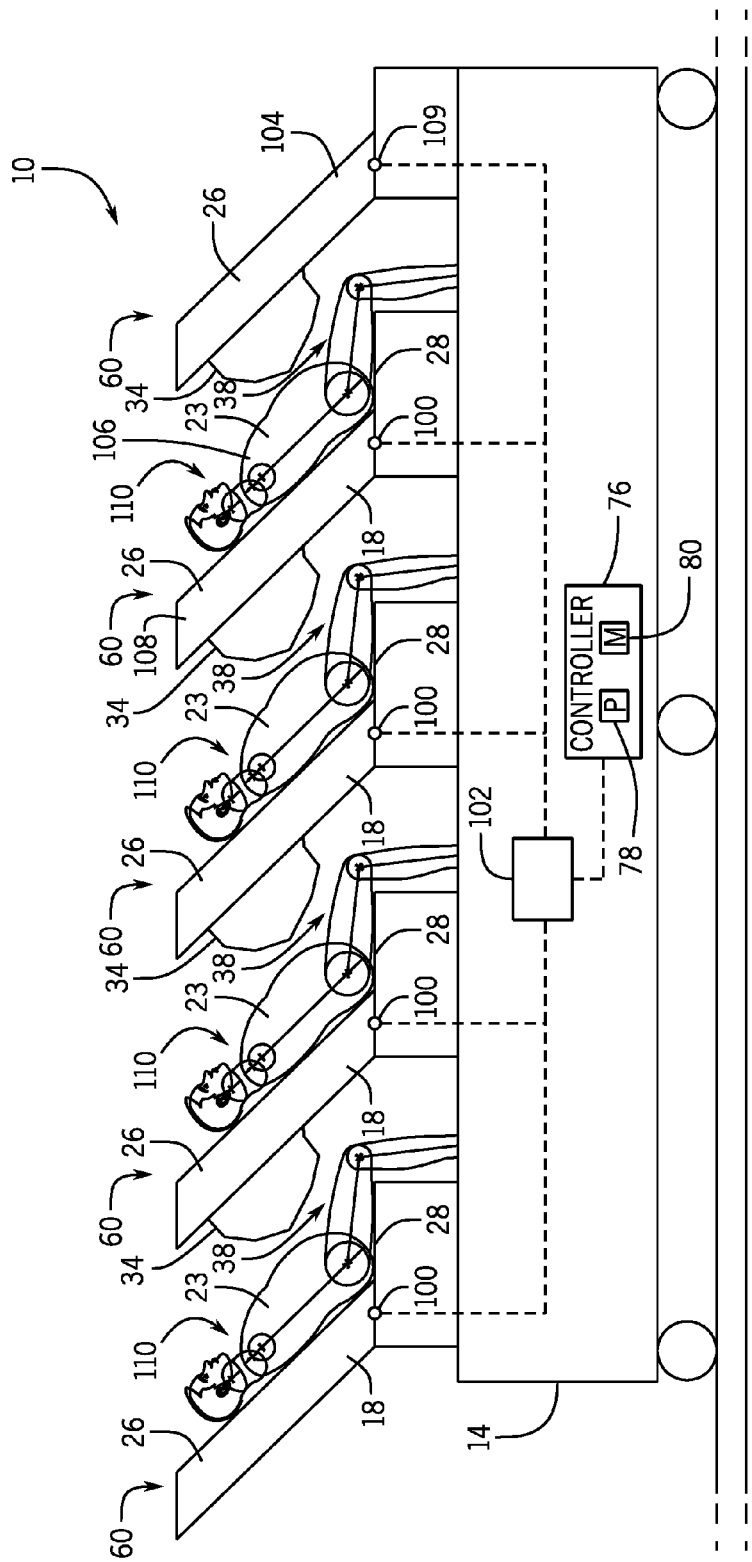
FIG. 3 is an elevation view of another embodiment of the ride vehicle of FIG. 1 with the seatback passenger restraint in an active position, in accordance with an aspect of the present disclosure.

As shown in the illustrated embodiment of FIG. 2, the active position 60 substantially maintains the passengers 23 in the predetermined posture 46. Therefore, although the passengers 23 may tilt (e.g., rotate) with respect to the ride vehicle 10, the posture of the passengers 23 remains substantially the same. However, in other embodiments, the posture of the passengers 23 may change as the ride vehicle 10 shifts from the loading position 12 to the active position 60 (or vice versa). For example, FIG. 3 is an elevation view of another embodiment of the ride vehicle 10 in the active position 60. As shown in the illustrated embodiment of FIG. 3, ride vehicle 10 does not include the passenger platforms 32 that rotate with respect to the base 14. Rather, the seatbacks 26 are configured to recline and position the passenger restraints 34 proximate to the laps 38 of the passengers 23. For example, in some embodiments, the passenger restraints 34 may not contact the laps 38 of the passengers 23, but form a gap between the passenger restraints 34 and the laps 38 of the passengers 23. The gap may include a predetermined distance such that the movement of the passengers 23 is substantially blocked with respect to the passenger seats 18 as the ride vehicle 10 moves along the ride path. In other embodiments, the passenger restraints 34 may contact the laps 38 of the passengers 23 to substantially block movement of the passengers 23 with respect to the passenger seats 18.

In some embodiments, the seatbacks 26 may rotate (e.g., tilt and/or pivot) with respect to the seat portion 28 and/or the base 14. Therefore, the seatbacks 26 may be separate from the seat portions 28, such that the seatbacks 26 may rotate while the seat portions 28 remain substantially stationary (e.g., with respect to the base 14). Accordingly, the seatback 26 may be coupled to the seat portions 28 via a hinge 100. Additionally, the hinge 100 may be controlled by an actuator 102 (e.g., a motor, a pneumatic actuator, and/or a hydraulic actuator) to rotate the seatback 26 with respect to the seat portions 28. As discussed above, the actuator 102 may be coupled to the controller 76, which may control movement of the passenger seats 18 from the loading position 12 to the active position 60 (and vice versa).

As shown in the illustrated embodiment of FIG. 3, the ride vehicle 10 may include a front restraint 104, which may not be configured to seat a passenger 23, but may secure a passenger 106 within a front passenger seat 108. Accordingly, the front restraint 104 may be configured to move from the loading position 12 to the active position 60. When the front restraint 104 is in the active position 60, the passenger 106 may be secured within the front passenger seat 108. The front restraint 104 may include a hinge 109 configured to enable the front restraint 104 to rotate with respect to the base 14. In some embodiments, the hinge 109 may also be coupled to the actuator 102 and rotation of the front restraint 104 may be driven by the actuator 102. In other embodiments, the ride vehicle 10 may include an additional actuator, separate from the actuator 102 that is configured to drive rotation of the front restraint 104.

Additionally, FIG. 3 illustrates the passengers 23 in a reclined posture 110 when the ride vehicle 10 (and the passenger seats 18) are in the active position 60. The reclined posture 110 may facilitate a view of the passengers 23 of scenery and/or other visual features of the amusement ride. Additionally, the reclined posture 110 may provide additional comfort to the passengers 23 as the ride vehicle 10 moves along the ride path, thereby enhancing the experience of the passengers 23. It should be noted that FIG. 3 actually shows a transition and that when in a fully active position, the restraints 34 engage the passengers 23 (e.g., conforming about their upper legs).

Figure 4:
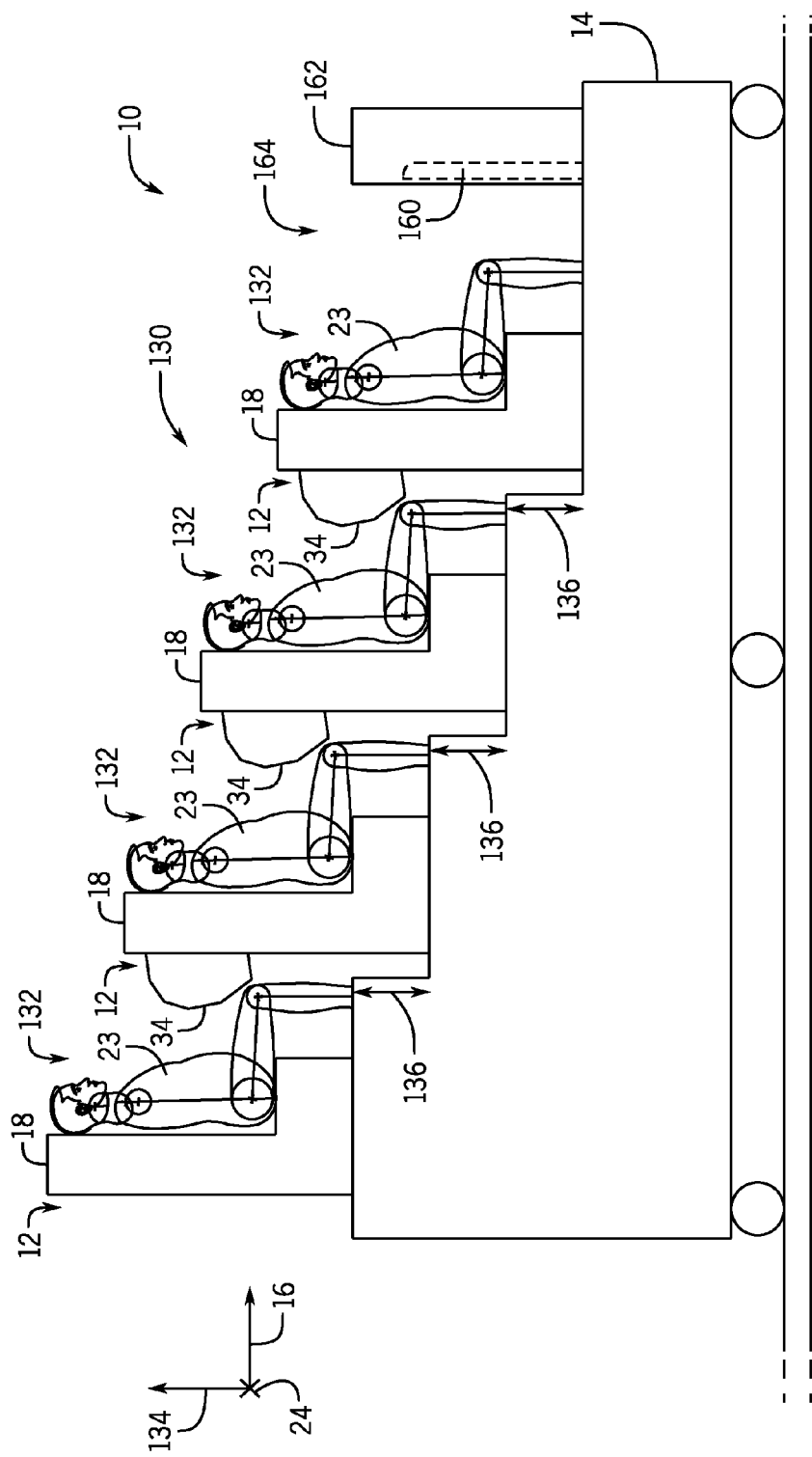
FIG. 4 is an elevation view of an embodiment of a ride vehicle having a tiered configuration and that includes seatback passenger restraints in a loading position, in accordance with an aspect of the present disclosure.

In still further embodiments, the ride vehicle 10 may include a tiered configuration 130, such that rows 132 of the passenger seats 18 are offset from one another along a lateral axis 134. For example, FIG. 4 is an elevation view of an embodiment of the ride vehicle 10 that includes the tiered configuration 130. Accordingly, in some embodiments, the passengers 23 may reach the passenger seats 18 via steps included in the ride vehicle 10. In other embodiments, a loading platform of the ride vehicle 10 may include a corresponding tiered configuration, thereby enabling the passengers 23 to reach the passenger seats 18 without including an aisle with steps in the ride vehicle 10.

The tiered configuration 130 may offset the passenger seats 18 by a distance 136. In some embodiments, the distance 136 between passenger seats 18 may be uniform for the ride vehicle 10. In other embodiments, the distance 136 may vary to account for engineering and/or manufacturing tolerances. As a non-limiting example, the distance 136 may be between 1 inch and 24 inches, between 5 inches and 12 inches, or between 7 inches and 10 inches. In any event, the distance 136 may be predetermined, such that the passenger restraints 34 are positioned proximate to the passengers 23 in the active position 60 to secure the passengers 23 within the passenger seats 18.

Figure 5:
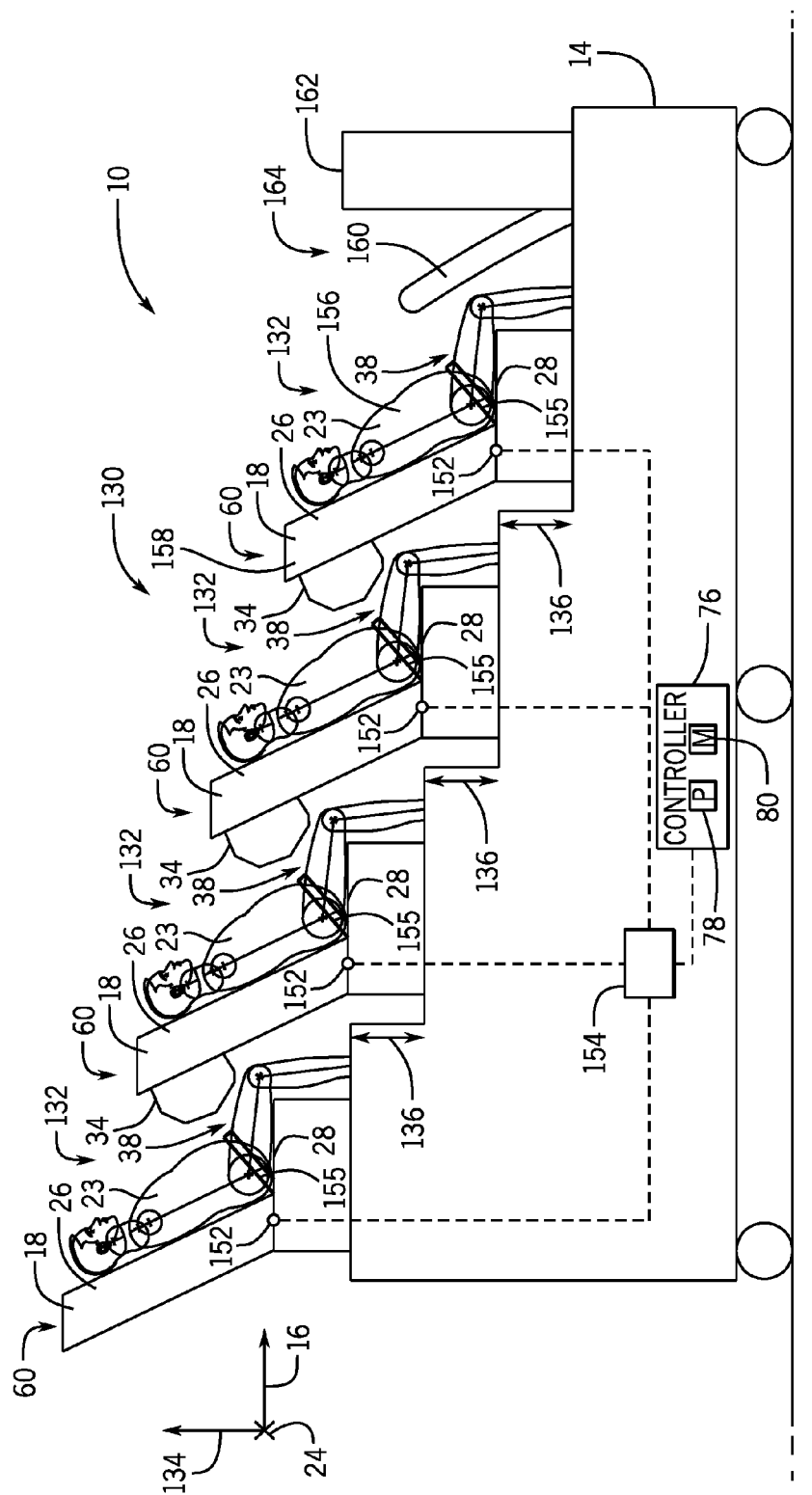
FIG. 5 is an elevation view of an embodiment of the ride vehicle of FIG. 4 with the seatback passenger restraints in an active position, in accordance with an aspect of the present disclosure.

For example, FIG. 5 is an elevation view of the ride vehicle 10 of FIG. 4 in the active position 60 (transitioning to a fully active position). As shown in the illustrated embodiment of FIG. 5, the seatbacks 26 are reclined in the active position 60 when compared to the loading position 12. In some embodiments, the seatbacks 26 are configured to rotate (e.g., tilt and/or pivot) with respect to the seat portion 28 and/or the base 14. Therefore, the seatbacks 26 may be separate from the seat portions 28, such that the seatbacks 26 may rotate while the seat portions 28 remain substantially stationary (e.g., with respect to the base 14). Accordingly, the seatback 26 may be coupled to the seat portions 28 via a hinge 152. Additionally, the hinge 152 may be controlled by an actuator 154 (e.g., a motor, a pneumatic actuator, and/or a hydraulic actuator) to rotate the seatback 26 with respect to the seat portions 28. As discussed above, the actuator 154 may be coupled to the controller 76, which may control movement of the passenger seats 18 from the loading position 12 to the active position 60 (and vice versa).

In comparison to the embodiment of FIG. 3, the tiered configuration 130 of the ride vehicle 10 may enable a posture of the passengers 23 to be more upright (e.g., closer to the loading position 12). For example, the posture of the passengers 23 may be adjusted to a lesser degree when the tiered configuration 130 is included in the ride vehicle 10 because the seatbacks 26 may be positioned closer to the laps 38 of the passengers 23 when in the loading position 12. Therefore, the passengers 23 may not experience substantial movement from the loading position 12 to the active position 60.

When the ride vehicle 10 is in the active position 60, the passenger restraints 34 may be proximate to the laps 38 of the passengers 23, thereby securing the passengers 23 into a respective passenger seat 18 (e.g., substantially blocking movement of the passengers 23 with respect to the passenger seats 18). In some embodiments, the passenger restraints 34 operate alone or only in conjunction with a seat belt 155. As shown in the illustrated embodiment of FIG. 5, a passenger 156 seated in a front most passenger seat 158 (e.g., with respect to the direction 16) may be secured into the passenger seat 158 by a lap bar 160. For example, the lap bar 160 may be configured to rotate relative to the base 14 when moving from the loading position 12 (e.g., FIG. 4) to the active position 60 (e.g., FIG. 5). In some embodiments, the lap bar 160 may be positioned in a housing 162 coupled to the ride vehicle 10 when in the loading position 12 (see, e.g., FIG. 4). Accordingly, a walkway 164 of the passenger 156 may not be blocked by the lap bar 160 when passenger 156 enters and exits the ride vehicle 10 (e.g., during loading and/or unloading). However, when in the active position 60, the lap bar 160 secures the passenger 156 in the passenger seat 158. In other embodiments, other suitable restraint techniques may be utilized to secure the passenger 156 in the passenger seat 158 (e.g., a seat belt and/or a lap bar offset with the passenger seat 158 with respect to the axis 134).

Figure 6:
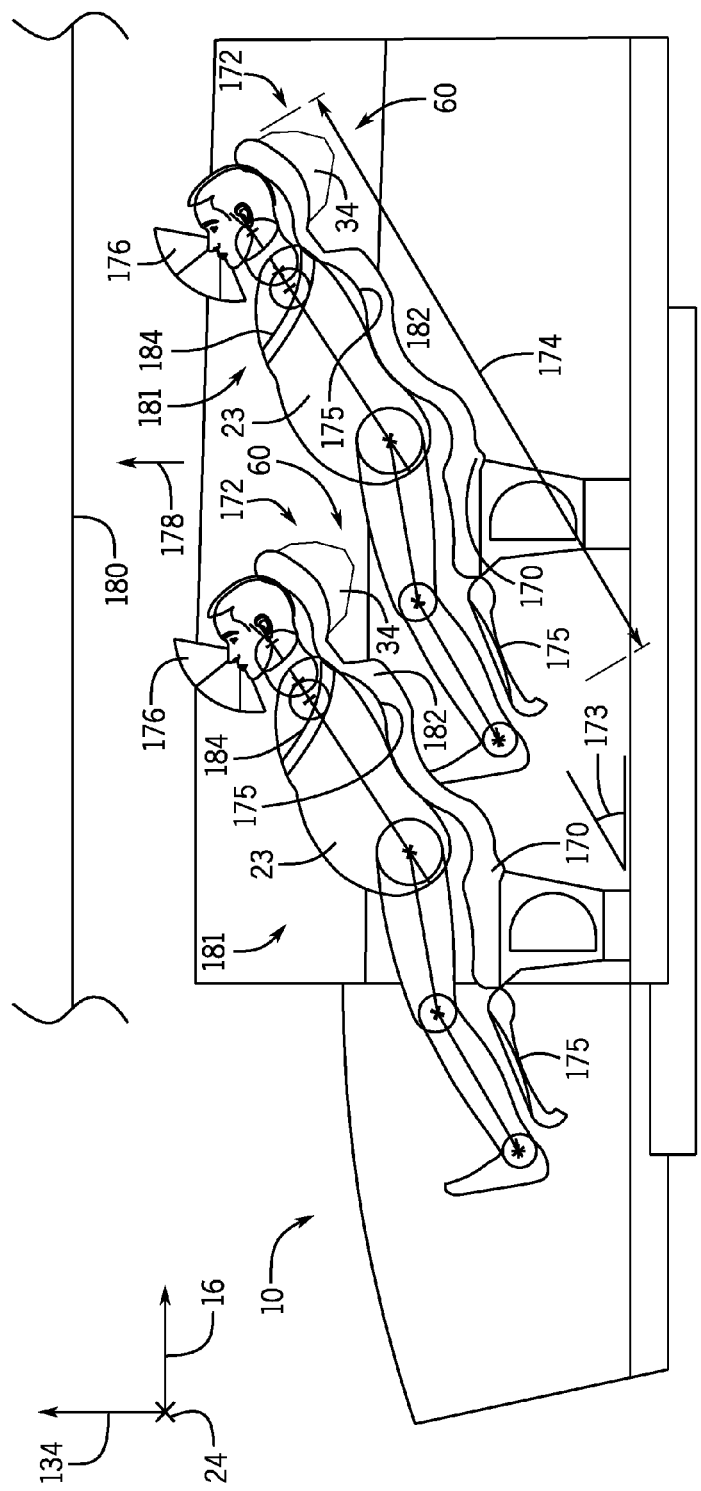
FIG. 6 is an elevation view of an embodiment of the ride vehicle with seatback passenger restraints on seatbacks that are in a reclined position.

FIG. 6 is an elevation view of another embodiment of the ride vehicle 10 having passenger seats 170 that may be in a reclined position 172 when in the active position 60. For example, the passengers 23 may be seated in a substantially horizontal position (e.g., laying down) with respect to the ride vehicle 10. In other words, a body of each of the passengers 23 may extend (e.g., from feet of each of the passengers 23 to a head of each of the passengers 23) in the direction 16. In some embodiments, the passenger seats 170 may be at an angle 173 with respect to the ride vehicle 10 when in the reclined position 172. For example, the angle 173 may be between 150 degrees and 200 degrees, between 160 degrees and 180 degrees, between 160 degrees and 170 degrees, or approximately (e.g., within 5 percent of or within 10 percent of) 180 degrees. In some embodiments, the reclined position 172 may provide the passengers 23 with a substantially weightless sensation during the duration of the ride because forces that occur as the ride vehicle travels along a ride path may be absorbed by an increased portion of the passenger seats 170. In other words, the passengers 23 may experience a flight-like sensation when in the reclined position 172 as the ride vehicle 10 travels along the ride path. Additionally or alternatively, the reclined position 172 may enable a weight of each of the passengers 23 to be distributed more evenly over an entire length 174 of the passenger seats 170. For example, positioning the passengers 23 in the reclined position 172 increases an amount of each body of the passengers 23 that is exposed to, absorbs, and/or experiences gravitational forces. In some embodiments, the passenger seats 170 may include one or more inflatable bladders 175 that increase this sensation (e.g., the inflatable bladders further distribute the weight of the passengers 23). Therefore, the passengers 23 may incur an enhanced or new experience in the ride vehicle 10 that includes the passenger seats 170 because of the increased distribution of forces on the passengers 23.

Further, the reclined position 172 may direct a viewpoint 176 of the passengers 23 generally upward 178 with respect to the ride vehicle 10 (e.g., along the lateral axis 134). Thus, the passengers 23 may view a screen 180 positioned vertically upward 178 with respect to the ride vehicle 10 (e.g., along the lateral axis 134). In some embodiments, the screen 180 may surround the ride vehicle 10, such that the passengers 23 may view the screen 180 from a plurality of viewpoints 176. For example, the screen 180 may be substantially dome-shaped, cube-shaped, and/or polygonal shaped to enable the passengers 23 to view the screen 180 from substantially anywhere along the ride path. The experience of the passengers 23 may then be a combination of the forces incurred from the ride vehicle 10 travelling along the ride path as well as the visual imagery that may be viewed on the screen 180.

Additionally, the reclined position 172 of the passenger seats 170 may enable the viewpoint 176 of the passengers 23 to be substantially unobstructed by another passenger 23. In other words, the reclined position 172 enables each of the passengers 23 to view the screen 180 without another passenger 23 obstructing the viewpoint 176. The reclined position 172 may also reduce obstructions that may be caused by another ride vehicle 10 that is positioned in front of or behind the ride vehicle 10 with respect to the direction 16. Further, in some embodiments, rows 181 of the ride vehicle 10 that extend along the lateral axis 24 may be vertically offset from one another along the lateral axis 134. In such embodiments, the viewpoint 176 of the passengers 23 may be enhanced due to a reduction of obstructions that may be caused by passengers 23 in other rows 181, for example (e.g., a row directly in front of one of the passengers 23 with respect to the direction 16). While the illustrated embodiment of FIG. 6 shows the ride vehicle 10 having two of the rows 181, in other embodiments, the ride vehicle 10 may include one row 181 or more than two of the rows 181 (e.g., three, four, five, six, seven, eight, nine, ten, or more of the rows 181).

Additionally, seatbacks 182 of the passenger seats 170 may include the passenger restraint 34, which may be utilized to secure the passengers 23 in the passenger seats 170. Therefore, as the passenger seats 170 move from the loading position 12 (not shown) to the active position 60, the passenger restraint 34 may substantially block movement of the passengers 34 with respect to the ride vehicle 10 and/or the passenger seats 170. Additionally or alternatively, the passenger seats 170 may include an additional restraint 184, such as a seatbelt, a lap bar, a shoulder restraint, another suitable restraint, or a combination thereof. The additional restraint 184 may be utilized to block movement of the passengers 34 with respect to the ride vehicle 10 and/or the passenger seats 170 that may otherwise be unblocked by the passenger restraint 34.

Figure 7:
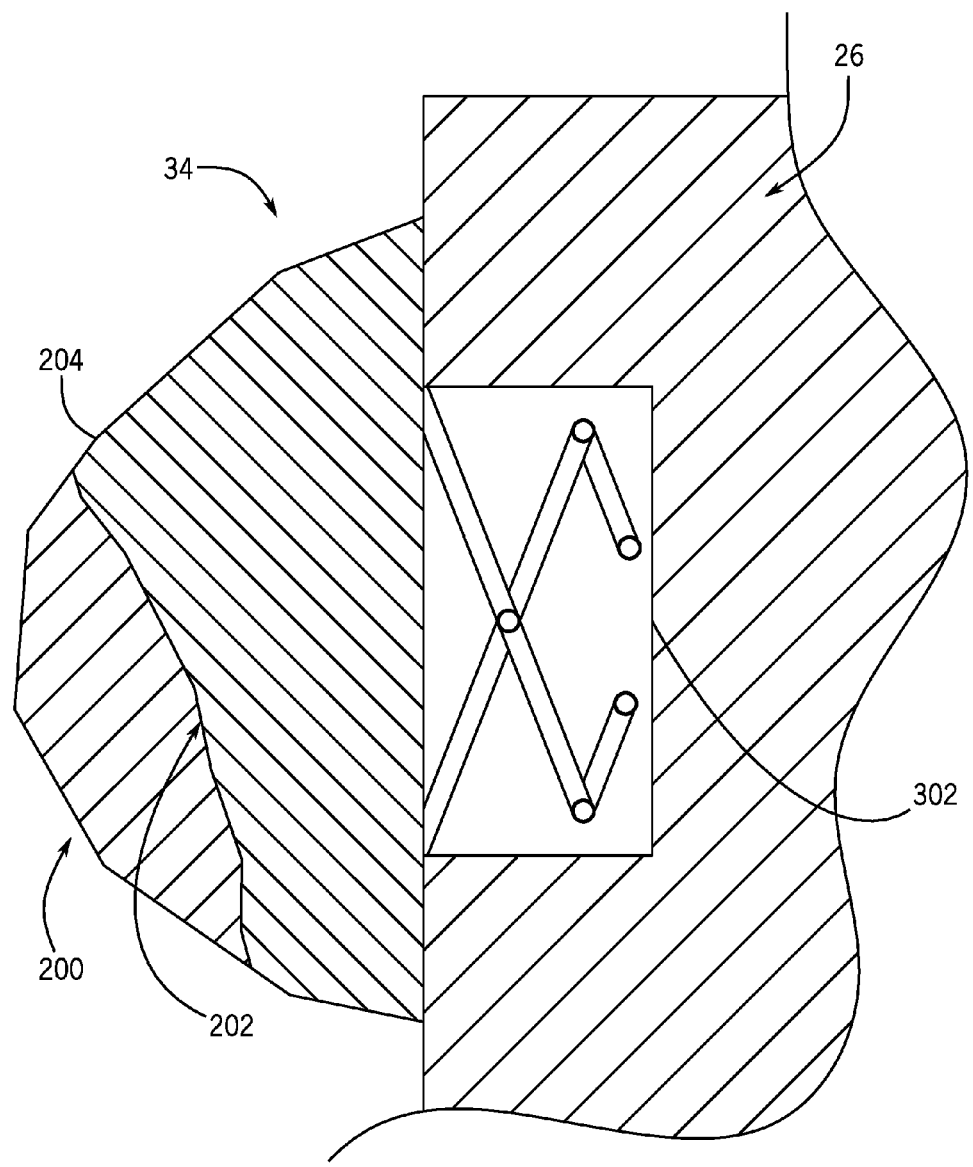
FIG. 7 is a cross-section of an embodiment of a passenger seat of the ride vehicle of FIGS. 1-6, in accordance with an aspect of the present disclosure.

FIG. 7 is a cross-sectional view of the seatback 26 and an embodiment of the passenger restraint 34. As shown in the illustrated embodiment of FIG. 7, the passenger restraint 34 of FIG. 7 may include a contoured cummerbund configuration 200. The contoured cummerbund configuration 200 may conform to a shape of the lap 38 of the passengers 23. For example, the contoured cummerbund configuration 200 may include one or more indentations 202 configured to conform to legs (e.g., thighs) of the passenger 23. Accordingly, in some embodiments, when the passenger restraint 34 is moved into the active position 60, the one or more indentations 202 may create a gap between the lap 38 of the passenger 23 and the passenger restraint 34. In other embodiments, the one or more indentations 202 may contact the lap 38 and/or chest of the passenger 23, but enhance a comfort of the passenger 23 because the passenger restraint 34 generally conforms to the shape of the passenger 23.

As shown in the illustrated embodiment, the passenger restraint 34 includes a generally semi-circular cross section 204. In some cases, the semi-circular cross section 204 may enable the passenger restraint 34 to conform to the shape of the passenger 23. In other embodiments, the passenger restraint 34 may include a rectangular cross-section, a polygonal cross-section, a circular cross-section, and/or any other suitably shaped cross-section that secures the passenger 23 in the passenger seat 18 as the ride vehicle 10 moves along the ride path.

In some embodiments, the passenger restraints 34 may include a resilient material to further conform to the shape of the lap 38 of the passenger 23 and provide additional comfort. For example, the passenger restraint 34 may include a polymeric material such as polyethylene, polypropylene, and/or polyurethane formed into a foam. In other embodiments, the passenger restraint 34 may include any material and/or combination of materials that may secure the passenger 23 to the passenger seat 18. In some embodiments, the material forming the passenger restraint 34 is sufficiently compliant to accommodate the range of passenger 23 sizes. However, in other embodiments, an extension arm 302 may facilitate adjustment of the passenger restraint 34 as well. Indeed, the extension arm 302 may actuate to facilitate engagement of smaller passengers and lock into place when a threshold of resistance is met.

While only certain features of the present disclosure have been illustrated and described herein, many modifications and changes will occur to those skilled in the art. It is, therefore, to be understood that the appended claims are intended to cover all such modifications and changes as fall within the true spirit of the present disclosure.

The invention claimed is:

1. A ride assembly, comprising:
   a ride vehicle configured to carry one or more passengers and to move in a direction along a ride path;
   a first passenger seat of the ride vehicle comprising a seatback, wherein the first passenger seat of the ride vehicle is configured to seat a first passenger of the one or more passengers, and wherein the seatback is configured to rotate with respect to the ride vehicle from a loading position to an active position;
   a second passenger seat of the ride vehicle positioned behind the first passenger seat with respect to the direction, wherein the second passenger seat is configured to seat a second passenger of the one or more passengers; and
   a passenger restraint coupled to the seatback of the first passenger seat, wherein the passenger restraint is configured to secure the second passenger in the second passenger seat when the seatback is in the active position.

2. The ride assembly of claim 1, wherein the passenger restraint is positioned proximate to a lap of the second passenger when the seatback is in the active position.

3. The ride assembly of claim 2, wherein the passenger restraint comprises an indentation configured to conform to the lap of the second passenger.

4. The ride assembly of claim 1, wherein the passenger restraint comprises a semi-circular cross section.

5. The ride assembly of claim 1, wherein the first passenger seat is coupled to a first passenger platform of the ride vehicle and the second passenger seat is coupled to a second passenger platform of the ride vehicle, wherein the first and second passenger platforms are configured to rotate with respect to a base of the ride vehicle from the loading position to the active position.

6. The ride assembly of claim 5, wherein the first passenger platform, or the second passenger platform, or both are coupled to the base of the ride vehicle via a hinged connection.

7. The ride assembly of claim 6, comprising an actuator configured to direct rotation of the first passenger platform, the second passenger platform, or both, about the hinged connection.

8. The ride assembly of claim 7, comprising a controller configured to instruct the actuator to direct rotation of the first passenger platform, the second passenger platform, or both.

9. The ride assembly of claim 5, wherein the first passenger seat is coupled to the first passenger platform via a first support, wherein the second passenger seat is coupled to the second passenger platform via a second support.

10. The ride assembly of claim 9, wherein the first support, or the second support, or both include telescoping members configured to increase a length of the first support, or the second support, or both when the seatback moves from the loading position to the active position.

11. A ride assembly, comprising:
    a ride vehicle configured to carry a plurality of passengers and to move in a direction along a ride path;
    a plurality of passenger seats of the ride vehicle, wherein each of the plurality of passenger seats is configured to seat a corresponding passenger of the plurality of passengers;
    a plurality of seatbacks of the plurality of passenger seats, wherein each seatback of the plurality of seatbacks is configured to rotate with respect to the ride vehicle from a loading position to an active position; and
    a passenger restraint coupled to a first seatback of the plurality of seatbacks of a first passenger seat of the plurality of passenger seats, wherein the passenger restraint is configured to secure a passenger of the plurality of passengers in a second passenger seat of the plurality of passenger seats when the seatback is in the active position, wherein the second passenger seat is positioned behind the first passenger seat with respect to the direction.

12. The ride assembly of claim 11, wherein the plurality of passenger seats of the ride vehicle are arranged in a tiered configuration such that the plurality of passenger seats are offset with respect to one another along a lateral axis, crosswise to the direction.

13. The ride assembly of claim 12, wherein the plurality of passenger seats are offset with respect to one another, such that a distance between a base of the first passenger seat and the second passenger seat is between 7 inches and 10 inches.

14. The ride assembly of claim 11, wherein each passenger seat of the plurality of passenger seats comprises a seat portion and a support, wherein the support is coupled to the ride vehicle.

15. The ride assembly of claim 14, wherein the seat portion and the support are configured to remain substantially stationary with respect to the ride vehicle when the plurality of seatbacks rotate from the loading position to the active position.

16. The ride assembly of claim 11, wherein the plurality of passenger seats are configured to move to a reclined position when the plurality of seatbacks is in the active position, and wherein the plurality of passenger seats comprise an inflatable bladder.

17. A ride assembly, comprising:
    a ride vehicle configured to carry one or more passengers and to move in a direction along a ride path;
    a base of the ride vehicle;
    a first passenger platform of the ride vehicle;
    a second passenger platform of the ride vehicle positioned behind the first passenger platform with respect to the direction, wherein the first and second passenger platforms are configured to rotate with respect to the base from a loading position to an active position;
    a first passenger seat of the ride vehicle coupled to the first passenger platform;
    a second passenger seat of the ride vehicle coupled to the second passenger platform; and
    a passenger restraint coupled to a seatback of the first passenger seat, wherein the passenger restraint is configured to secure a passenger of the one or more passengers in the second passenger seat when the first and second passenger platforms are in the active position.

18. The ride assembly of claim 17, wherein the first passenger platform, or the second passenger platform, or both are coupled to the base via a hinged connection.

19. The ride assembly of claim 18, comprising an actuator configured to direct rotation of the first passenger platform, the second passenger platform, or both, about the hinged connection, and wherein the second passenger seat is coupled to the second passenger platform via a support having a telescoping portion to substantially maintain a posture of the passenger of the one or more passengers in the second passenger seat.

20. The ride assembly of claim 19, wherein the first passenger seat, the second passenger seat, or both are configured to be in a reclined position when the first and second passenger platforms are in the active position, and wherein the first passenger seat, the second passenger seat, or both comprise an inflatable bladder.

* * * * *